(12) United States Patent
Paukner et al.

(10) Patent No.: US 11,060,473 B2
(45) Date of Patent: Jul. 13, 2021

(54) METHOD FOR COMMISSIONING AN INTERNAL COMBUSTION ENGINE, AND MOTOR VEHICLE COMPRISING AN INTERNAL COMBUSTION ENGINE

(71) Applicant: VOLKSWAGEN AKTIENGESELLSCHAFT, Wolfsburg (DE)

(72) Inventors: Stefan Paukner, Wolfsburg (DE); Falk-Christian Baron Von Ceumern-Lindenstjerna, Braunschweig (DE); Michael Manz, Langenhagen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 90 days.

(21) Appl. No.: 16/603,518

(22) PCT Filed: Apr. 6, 2018

(86) PCT No.: PCT/EP2018/058838
§ 371 (c)(1),
(2) Date: Oct. 7, 2019

(87) PCT Pub. No.: WO2018/189047
PCT Pub. Date: Oct. 18, 2018

(65) Prior Publication Data
US 2021/0087990 A1    Mar. 25, 2021

(30) Foreign Application Priority Data

Apr. 10, 2017 (DE) ..................... 10 2017 107 678.6

(51) Int. Cl.
*F02D 41/02* (2006.01)
*F02D 41/06* (2006.01)
(Continued)

(52) U.S. Cl.
CPC .............. *F02D 41/062* (2013.01); *B60K 6/24* (2013.01); *B60K 6/26* (2013.01); *B60K 6/28* (2013.01);
(Continued)

(58) Field of Classification Search
CPC ............... F02D 41/0255; F02D 41/062; F02D 41/1446; F02D 41/1494; F02D 2200/0802;
(Continued)

(56) References Cited

U.S. PATENT DOCUMENTS

2002/0100272 A1    8/2002 Nishimura
2003/0070423 A1    4/2003 Morinaga
(Continued)

FOREIGN PATENT DOCUMENTS

DE    40 19 067 A1    12/1991
DE    4223954 C1     1/1994
(Continued)

OTHER PUBLICATIONS

International Search Report of PCT Application No. PCT/EP2018/058838, dated Jul. 3, 2018.
(Continued)

*Primary Examiner* — Audrey K Bradley
(74) *Attorney, Agent, or Firm* — Pearl Cohen Zedek Latzer Baratz LLP

(57) ABSTRACT

The invention relates to a method for starting an internal combustion engine, the exhaust gas system of which is equipped with an electrically heatable lambda sensor and a catalytic converter with an oxygen reservoir. The combination of method steps according to the invention allows the internal combustion engine to be started with an optimal raw emission reduction directly after a cold start and an optimal pollutant conversion in the warm-up phase. The invention (Continued)

likewise relates to a motor vehicle with an internal combustion engine comprising an exhaust gas system having an electrically heatable lambda sensor and a catalytic converter with an oxygen reservoir, and comprising a controller, wherein the controller is designed to carry out the method according to the invention.

10 Claims, 3 Drawing Sheets

(51) Int. Cl.
   *F02D 41/14* (2006.01)
   *F01N 3/20* (2006.01)
   *B60L 58/12* (2019.01)
   *B60K 6/24* (2007.10)
   *B60K 6/26* (2007.10)
   *B60K 6/28* (2007.10)
   *B60R 22/48* (2006.01)
   *B60R 25/01* (2013.01)

(52) U.S. Cl.
   CPC .............. *B60L 58/12* (2019.02); *B60R 22/48* (2013.01); *B60R 25/01* (2013.01); *F01N 3/2013* (2013.01); *F02D 41/0255* (2013.01); *F02D 41/1446* (2013.01); *F02D 41/1494* (2013.01); *B60R 2022/4808* (2013.01); *B60Y 2200/92* (2013.01); *B60Y 2300/431* (2013.01); *B60Y 2300/474* (2013.01); *B60Y 2400/11* (2013.01); *B60Y 2400/302* (2013.01); *F01N 2560/025* (2013.01); *F01N 2560/20* (2013.01); *F02D 2200/0802* (2013.01); *F02D 2200/50* (2013.01)

(58) Field of Classification Search
   CPC .............. F02D 2200/50; F01N 3/2013; F01N 2560/025; F01N 2560/20; B60L 58/12; B60K 6/24; B60K 6/26; B60K 6/28; B60R 22/48; B60R 25/01; B60R 2022/4808; B60Y 2200/92; B60Y 2300/431; B60Y 2300/474; B60Y 2400/11; B60Y 2400/302

See application file for complete search history.

(56) References Cited

U.S. PATENT DOCUMENTS

| | | |
|---|---|---|
| 2004/0182069 A1 | 9/2004 | Goralski et al. |
| 2008/0282673 A1 | 11/2008 | Gonze et al. |
| 2009/0114188 A1 | 5/2009 | Peters et al. |
| 2009/0301437 A1 | 12/2009 | Mizoguchi et al. |
| 2013/0291630 A1* | 11/2013 | Takagi ............... F01N 9/00 73/114.75 |
| 2016/0115880 A1 | 4/2016 | Kondo et al. |

FOREIGN PATENT DOCUMENTS

| | | |
|---|---|---|
| DE | 4331853 A1 | 3/1994 |
| DE | 10 2012 205 017 A1 | 10/2012 |
| DE | 10 2013 216 024 A1 | 2/2015 |
| DE | 10 2013 221 595 A1 | 4/2015 |
| EP | 1182340 A2 | 2/2002 |
| FR | 2822900 A1 | 10/2002 |
| JP | 2005264891 A * | 9/2005 |
| JP | 2010190203 A * | 9/2010 |
| WO | WO 2017/144222 A1 | 8/2017 |

OTHER PUBLICATIONS

Search report for German Patent Application No. 10 2017 107 678.6, dated Sep. 29, 2017.

* cited by examiner

METHOD FOR COMMISSIONING AN INTERNAL COMBUSTION ENGINE, AND MOTOR VEHICLE COMPRISING AN INTERNAL COMBUSTION ENGINE

CROSS-REFERENCE TO RELATED APPLICATIONS

This application is a National Phase Application of PCT International Application No. PCT/EP2018/058838, International Filing Date Apr. 6, 2018, claiming priority of German Patent Application No. 10 2017 107 678.6, filed Apr. 10, 2017, which is hereby incorporated by reference.

FIELD OF THE INVENTION

The invention relates to a method for starting an internal combustion engine, especially to a method for improving the cold-start behavior of the exhaust gas when the internal combustion engine is started. The invention also relates to a motor vehicle comprising an internal combustion engine and preferably comprising a control unit designed to carry out the method according to the invention for starting the internal combustion engine.

BACKGROUND OF THE INVENTION

Legislation on exhaust-gas emissions is becoming increasingly stricter, so that the automotive industry is faced with high requirements, which have to be met by appropriate measures aimed at reducing the raw emissions of engines and by an appropriate after-treatment of the exhaust gas. Particularly with the introduction of European emission standard Euro 6, the emissions limits for motor vehicles with gasoline engines have been made a great deal stricter. Moreover, the Real-Driving Emissions (RDE) legislation will take into account higher dynamics immediately after the engine has started, which is why it is ever more crucial to ensure minimal exhaust gas emissions, also directly after the engine has started.

When it comes to the exhaust gas composition of a gasoline engine, essential factors are not only the firing interval and the fuel used, but especially the air-fuel ratio, in other words, the mass ratio of air to fuel, in the engine combustion chamber. As a rule, this ratio is indicated as a dimensionless quantity $\lambda$ which designates the quotient of the air mass actually available in the combustion chamber and of the minimum air mass needed for complete combustion. When $\lambda=1$, this refers to a stoichiometric operation in which there is as much air mass available in the combustion chamber as is theoretically necessary for a complete conversion of the injected fuel. When $\lambda<1$, there is a lack of air in the combustion chamber and this is referred to as a rich mixture. When $\lambda>1$, there is an excess of air in the combustion chamber and this is referred to as a lean mixture.

In order for raw emissions that cannot be entirely avoided to be effectively converted outside of the engine, catalytic converters coated with noble metals are installed in the exhaust gas systems of internal combustion engines. During the normal mode of operation of the engine, such catalytic converters exhibit the best efficiency levels, that is to say, the best cleaning performance due to efficient exhaust gas conversions, in the so-called Lambda window with a $\lambda$ value between 0.97 and 1.03. Moreover, the catalytic converters require a minimum exhaust gas temperature level in order to be able convert the pollutants contained therein. It is a known procedure to use electric heating elements or internal engine measures to heat the catalytic converters. In this process, internal engine heating measures are usually associated with setting a specific combustion air ratio, that is to say, a specific target lambda.

In all of the prior-art methods for starting an internal combustion engine, the target lambda value is fed forward since a lambda sensor arranged in the exhaust gas channel to determine the lambda value is usually not yet ready for operation when the engine is started. In the case of such a feedforward, the actual measured lambda value is usually one to two percent different from the target value. This is due to the fact that, for example, the feedforward model cannot accurately take into account all of the influences acting on the internal combustion engine.

Therefore, in prior-art methods, an undefined temperature level of the lambda sensor when the engine is started leads not only to increased raw emissions but also to a reduced effectiveness of internal engine measures aimed at heating up the catalytic converter. Consequently, the present invention is based on the objective of providing a method for starting an internal combustion engine that reduces or overcomes the drawbacks of the state of the art and that improves the exhaust gas quality immediately after the engine has started.

SUMMARY OF THE INVENTION

This objective is achieved by a method according to the invention for starting an internal combustion engine, whereby the internal combustion engine has an attached exhaust gas system and is connected to a control unit. An electrically heatable lambda sensor and a catalytic converter are arranged in the exhaust gas system, whereby the catalytic converter has an oxygen storage component (OSC). The oxygen storage component preferably comprises at least one ceramic component containing cerium dioxide and/or zirconium oxide. The person skilled in the art is familiar with suitable catalytic converters having oxygen storage components.

In a first step of the method according to the invention, in response to the control unit having received a first control signal, the lambda sensor is electrically heated during a first phase already before the internal combustion engine is started, that is to say, while the internal combustion engine is still switched off. Preferably, an electric heating element is arranged on or in the lambda sensor and can be operated by means of the control unit. Only once an operating temperature of the lambda sensor has been reached is the internal combustion engine started in a second step of the method according to the invention. Thus, already when the internal combustion engine is started, the lambda sensor is completely ready to carry out regulations and a feedforward of the air-fuel mixture can advantageously be dispensed with.

Since the lambda sensor is ready to carry out regulations already when the engine is started, the internal combustion engine is operated in a precise lambda-regulated lean operation immediately after the start. When the engine is started, it can be assumed that the catalytic converter arranged in the exhaust gas system is still below its light-off temperature and therefore not yet fully operational, that is to say, it is not yet fully capable of converting raw emissions. The precisely adjustable lean operation of the internal combustion engine especially reduces HC and CO raw emissions, while a significant increase in NOx raw emissions does not take place. It has been found that an optimal exhaust gas quality is achieved in the lean operation of the started internal combustion engine at a target lambda between 1.05 and 1.15, particularly preferably of about 1.1.

In a third step of the method according to the invention, a precise lambda-regulated stoichiometric operation of the internal combustion engine is carried out once a first operating temperature of the catalytic converter has been reached. In this context, the first operating temperature of the catalytic converter is preferably the light-off temperature of the catalytic converter, above which the entire conversion potential of the catalytic converter can be fully utilized. The control of the stoichiometric operation of the internal combustion engine is preferably continuous, that is to say, the internal combustion engine is operated in such a way that a time-constant target lambda value is determined by the lambda sensor that is arranged in the exhaust gas channel.

In a fourth step of the method according to the invention, a precise lambda-regulated stoichiometric operation of the internal combustion engine with a varying target lambda value is carried out once a second operating temperature of the catalytic converter has been reached. The second operating temperature of the catalytic converter is preferably an activation temperature $T_3$ of the oxygen storage component arranged in the catalytic converter. Above the activation temperature, the oxygen storage component is able to dynamically incorporate oxygen into and remove oxygen from its structure. When the activation temperature of the oxygen storage component is exceeded, the best exhaust gas conversion result is achieved in the catalytic converter at a target lambda value that is regulated in a variable manner. Here, a target lambda of 1.0 is impinged with a forced amplitude of, for example, ±10%, preferably ±5% and particularly preferably ±2%. Thus, the target lambda value can vary, for example, between 0.98 and 1.02 once the second operating temperature has been reached.

It has been found that the combination of the steps of the method according to the invention can significantly reduce harmful HC, CO and NOx raw emissions immediately after the internal combustion engine has been started, and a high conversion rate in the downstream catalytic converter can be achieved very quickly. In a preferred embodiment of the method according to the invention, these positive effects are further enhanced when the internal combustion engine is operated with increased ignition energy in a lean operation until the first operating temperature of the catalytic converter is reached. The increased ignition energy is preferably provided by spark sequence ignitions in the form of need-based multiple ignitions and it improves the smooth running of the internal combustion engine as well as the homogeneity of the combustion gases over time. As a result, raw gas emissions are further reduced and the exhaust gas conversion in the catalytic converter can be carried out very uniformly.

In the method according to the invention, a ceramic sensor element is preferably used as the lambda sensor, especially as a Nernst sensor or as a wideband sensor. The lambda sensor preferably contains a solid-state electrolyte that is arranged in the exhaust gas stream of the internal combustion engine and that emits a voltage signal as a function of an oxygen partial pressure differential between the exhaust gas and a reference gas. Preferably, the solid-state electrolyte is based on zirconium dioxide. Preference is also given to the use of a hydrolock-resistant lambda sensor. The hydrolock-resistance can be achieved by arranging the lambda sensor in the exhaust gas channel, for example, in a sloping exhaust pipe piece, by a suitable orientation of a measuring opening of the lambda sensor, for example, counter to the exhaust gas stream, and/or by a porous ceramic protective layer on the sensor surface. The person skilled in the art knows how to ensure the hydrolock-resistance of lambda sensors. The lambda sensors used in the method according to the invention preferably have a resistance heating element.

In another preferred embodiment of the method according to the invention, the catalytic converter arranged in the exhaust gas system of the internal combustion engine has an electric heating element and it is also electrically heated up as soon as the control unit has received the first control signal. Thus, already before the internal combustion engine has started, the catalytic converter can be heated up to a temperature at which the catalytic converter already carries out a partial conversion of pollutants. Likewise preferably, owing to the electric heating before the engine starts, the catalytic converter reaches at least a threshold temperature above which at least 15%, also preferably at least 25%, and particularly preferably at least 35%, of the exhaust gas components entering the catalytic converter can be converted. In an alternative embodiment of the method according to the invention, the catalytic converter is heated up only by the heat transfer from the exhaust gas to the catalytic converter.

In the method according to the invention, a first and a second operating temperature of the catalytic converter serve as triggering events to gradually adjust the operation of the internal combustion engine that has been started. Here, the operating temperatures are preferably detected by means of a temperature sensor arranged on or in the electrically heatable catalytic converter. Alternatively, a temperature sensor can be dispensed with and the first and second operating temperatures can be determined using an exhaust gas temperature model. Such an exhaust gas temperature model is described, for example, in German patent application DE 10 2013 216 024 A1 and is normally based on an actual lambda value measured in the exhaust gas stream. In the method according to the invention, the lambda sensor is ready to carry out regulations, that is to say, ready to perform measurements when the engine starts. This means that reliable statements about the exhaust gas temperature can already be made immediately after the engine has started.

In the method according to the invention, the receipt of the first control signal by the control unit serves as a triggering event for heating up the lambda sensor. Preferably, the first control signal is a first control signal transmitted to the control unit by a door contact switch, by a receiver of a keyless locking system, by a receiver of a central lock or by a belt lock contact. Usually, the driver gets in just before the cold start of a vehicle and buckles up. Via a door contact switch, a receiver of a keyless locking system (keyless go system) or of a central lock or else via a belt contact switch, the sensors that are present in the motor vehicle can be used to trigger the first control signal already before the internal combustion engine is started and to initiate the electric heating of the lambda sensor. Alternatively, the first control signal can be generated by a charging-state sensor of the battery system.

In a hybrid vehicle (for example, PHEV—plug-in hybrid electric vehicle), preheating according to the first step of the method according to the invention can be initiated when the state of charge (SOC) of a battery system that powers the electric motor falls below a certain limit value and the engine of the internal combustion engine is thus about to start. Likewise preferably, the first control signal can be generated on the basis of navigation data, for example, by correlating an average range of the PHEV in the electric mode with a distance already traveled in this mode. As an alternative, especially in an autonomous driving mode as well as in electrical operation, a prediction can be used to generate the first control signal. Particularly in the latter cases, the first control signal can be generated in the control unit itself, whereby the control unit has a plurality of function modules and/or can comprise several individual control units.

The objective of the invention is also a motor vehicle comprising an internal combustion engine and an attached exhaust gas system, whereby the latter has an electrically heatable lambda sensor and a catalytic converter with an oxygen storage component. The motor vehicle also has a control unit that is configured to carry out the method according to the invention as described above. Preferably, the motor vehicle has an electric drive motor powered by a battery system, whereby the battery system has a charging-state sensor configured to output the first control signal.

The battery system preferably also serves as an energy source to electrically heat the lambda sensor and/or the electrically heatable catalytic converter. Especially for the electrical heating of the lambda sensor, a voltage converter is preferably arranged between the battery system and the heating element for heating the lambda sensor. In an alternative embodiment, the battery system is a high-voltage battery system with a system voltage of, for example, 48 V, and furthermore, an on-board system with an energy storage device, for example, a 12 V on-board system, is provided to electrically heat the lambda sensor and/or the electrically heatable catalytic converter.

Additional preferred embodiments of the invention can be gleaned from the other features put forward in the subordinate claims. Unless otherwise indicated in a specific case, the various embodiments of the invention cited in this application can be advantageously combined with each other.

BRIEF DESCRIPTION OF THE DRAWINGS

The invention will be explained below by means of embodiments on the basis of the accompanying drawings. The following is shown.

DETAILED DESCRIPTION OF THE INVENTION

Figure 1:
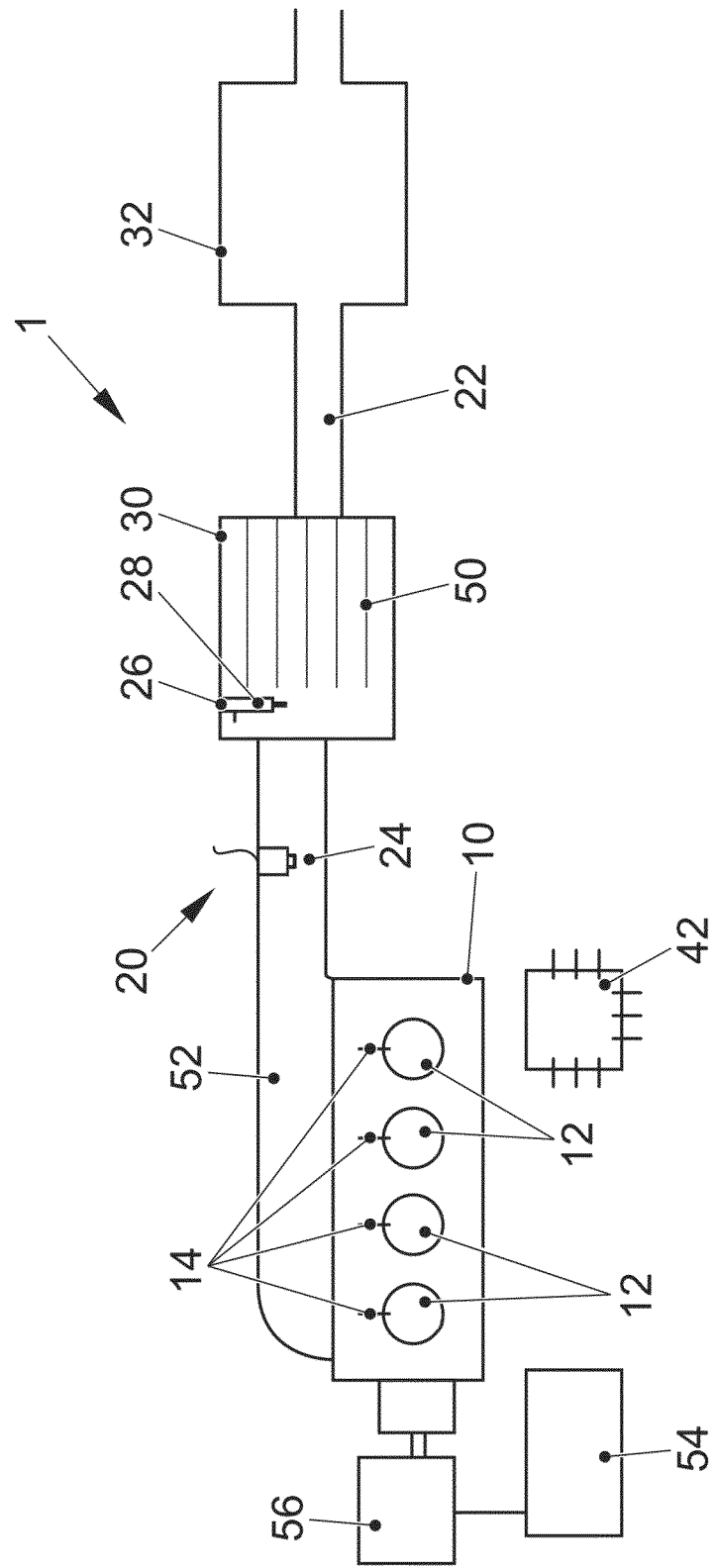
FIG. 1 a preferred variant of a drive system of a motor vehicle according to the invention, FIG. 2 another view of a motor vehicle according to the invention, FIG. 3 a flow diagram of a method according to the invention for starting an internal combustion engine, the curve of a target lambda value during the method according to the invention for starting an internal combustion engine, and the temperature curve at the lambda sensor and at the catalytic converter during the method according to the invention for starting an internal combustion engine, and FIG. 4 an alternative embodiment of a drive system of a motor vehicle according to the invention.

FIG. 1 shows a first embodiment of a motor vehicle 1 according to the invention comprising an internal combustion engine 10 and an exhaust gas system 20. The motor vehicle 1 according to the invention is preferably configured as a hybrid vehicle comprising an internal combustion engine 10 and an electric motor 56, particularly preferably with a gasoline engine that is externally ignited by spark plugs 14.

As shown in FIG. 1, the internal combustion engine 10 has at least one combustion chamber 12, preferably four combustion chambers 12, which are connected via a shared outlet 52 to an exhaust gas channel 22 of the exhaust gas system 20. The internal combustion engine 10 is preferably configured as a reciprocating engine, but can also be configured as a rotary combustion engine. The internal combustion engine 10 is preferably configured as an internal combustion engine 10 charged by an exhaust gas turbocharger or else configured as a naturally aspirated engine.

The exhaust gas system 20 has an electrically heatable lambda sensor 24 in the exhaust gas channel 22. Downstream from the lambda sensor 24, an electrically heatable catalytic converter 30 having a temperature sensor 26, an electric heating element 28 and an oxygen storage component (SOC) 50 is arranged in the exhaust gas channel 22. The electrically heatable catalytic converter 30 is preferably configured as an electrically conductive four-way catalytic converter 30 with an integrated particulate filter, whereby the catalytic converter 30 itself functions as a heating resistance 28 when an electric voltage is applied. Another catalytic converter 32, preferably a three-way catalytic converter, is arranged in the exhaust gas channel 22 downstream from the electrically heatable catalytic converter 30.

The electrically heatable lambda sensor 24, the temperature sensor 26 and the electric heating element 28 of the electrically heatable catalytic converter can be actuated via a control unit 42, preferably via the engine control unit of the internal combustion engine 10 or via a power control unit of the hybrid vehicle. The control unit 42 is especially configured to set the temperature of the electrically heatable lambda sensor 24. Preferably, independently of any measuring operation of the lambda sensor 24, the control unit can set the temperature of the lambda sensor 24 by means of a heating element that is integrated into the lambda sensor 24, in particular before the measuring operation of the lambda sensor 24 begins.

The electric drive motor 56 of the hybrid vehicle is supplied with voltage by a battery 54 which, if necessary using a voltage converter, can also be used to heat up the electric heating element 28 of the catalytic converter and/or to heat up the lambda sensor 24.

Figure 2:
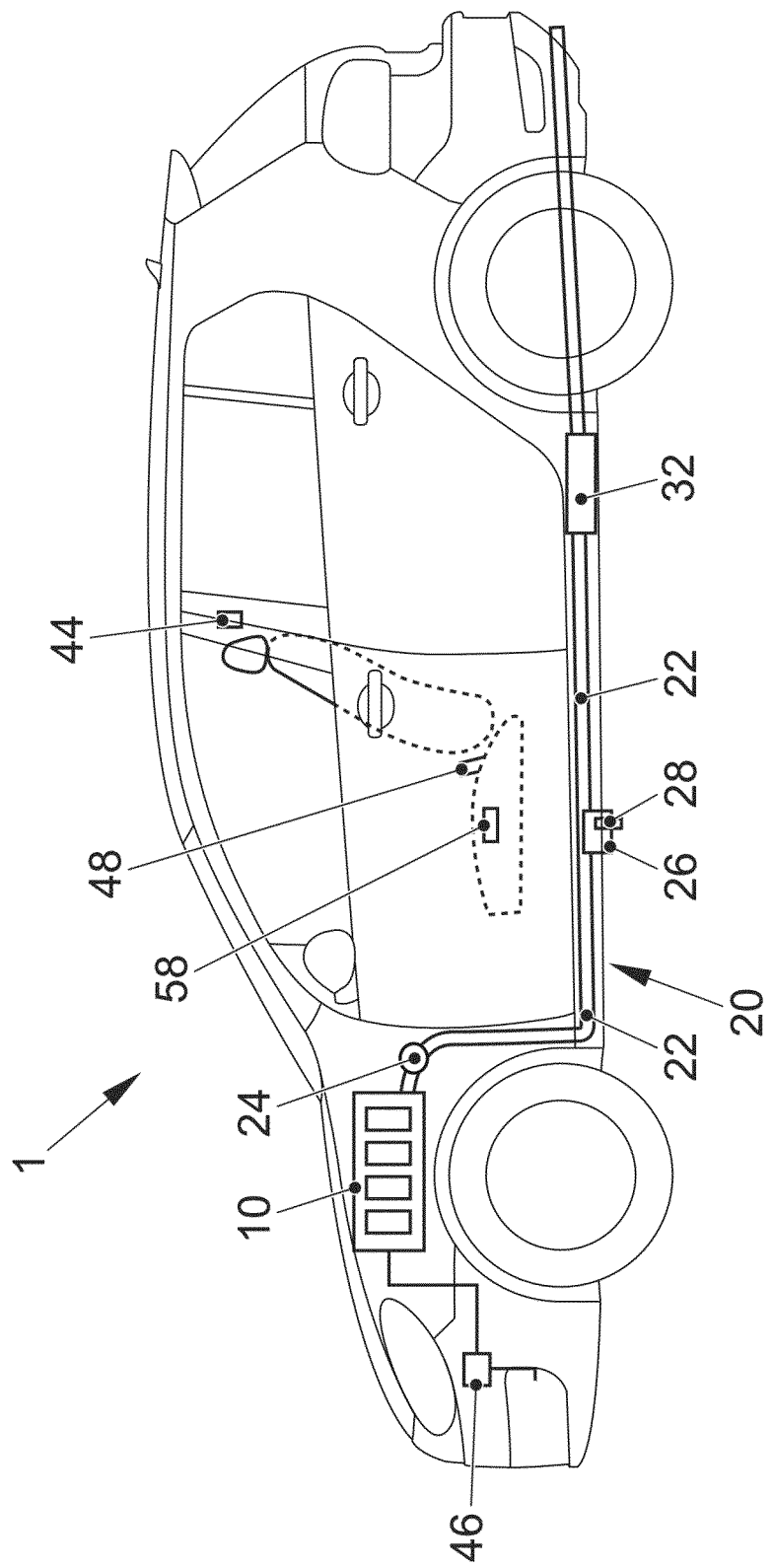

FIG. 2 shows another depiction of a motor vehicle 1 according to the invention. The motor vehicle 1 has an internal combustion engine 10 with an exhaust gas system 20. An electrically heated lambda sensor 24, an electrically heatable catalytic converter 30 having a temperature sensor 26 and an electric heating element 28 as well as, downstream from the electrically heatable catalytic converter 30, a second catalytic converter 32, which is configured as a three-way catalytic converter, are all arranged in the exhaust gas system 20 in the direction in which an exhaust gas of the internal combustion engine 10 flows through the exhaust gas channel 22.

The motor vehicle 1 has a plurality of sensors 44, 46, 48, which are configured to send a first control signal to a control unit 42 of the motor vehicle 1. By way of example, FIG. 2 shows a door contact switch 44, a receiver of a keyless locking system of the motor vehicle 46 and a belt lock sensor 48. As an alternative or in addition, however, other sensors, for example, a receiver of the transmitter of a central lock, a sensor 58 for detecting whether a seat is occupied, or a charging-state sensor of the battery system 56 can be provided.

Figure 3:
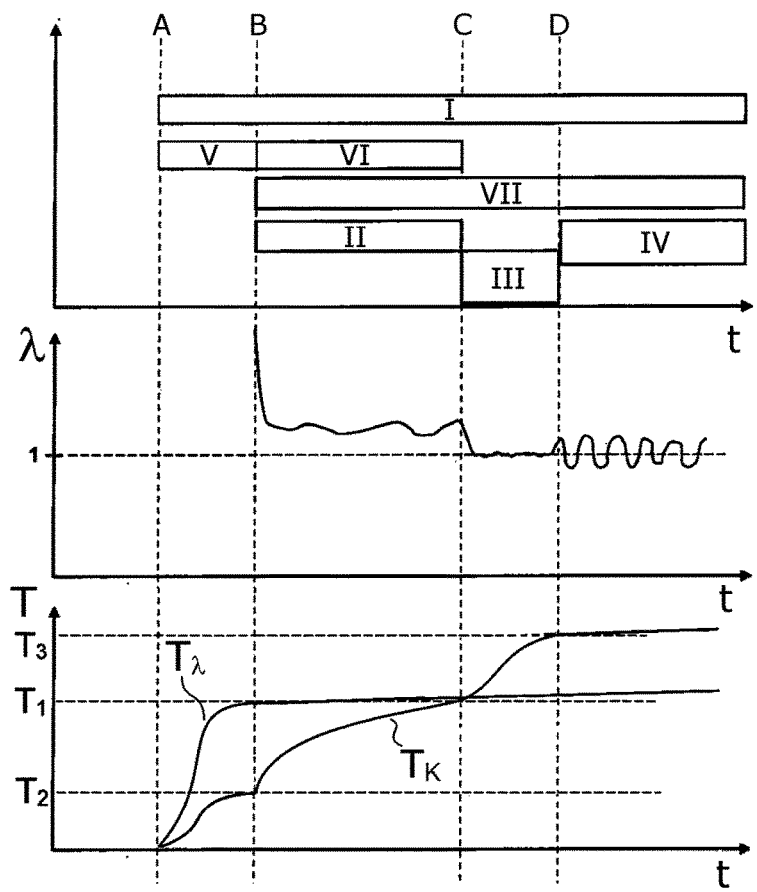

The sequence of a method according to the invention for starting an internal combustion engine 10 as shown in FIG. 3 is described below.

At point in time A, the control unit 42 receives a first control signal indicating that the engine of the internal combustion engine 10 is about to start. The first control signal can have been generated, for example, by one of the sensors 44, 46 or 48, 58 shown in FIG. 2. In response to the first control signal, the control unit 42 controls an electric heating element that is integrated into the heatable lambda sensor 24 in such a way that it heats the lambda sensor 24. Since the electric heating process, phase I, is activated by the first control signal of one of the sensors 44, 46, 48, 58, especially by the door contact switch 44, the lambda sensor 24 is heated well before the engine of the internal combustion engine 10 is started. As a result, during a first phase up to point in time B, the lambda sensor is heated up to its operating temperature $T_1$, so that the lambda sensor 24 is ready to carry out regulations during the entire period of time VII.

Subsequent to receiving the first control signal at the point in time A, the control unit 42 also regulates the electric heating element 28 of the catalytic converter 30 in such a way that it is heated purely electrically to a temperature $T_2$ during the first phase up to the point in time A. In this process, the temperature $T_2$ is below the light-off temperature of the catalytic converter 30, but nevertheless it allows fuel and oxygen to be exothermically converted to a limited extent on the catalytic surface of the catalytic converter. In this context, the light-off temperature is the temperature at which the catalytic converter converts 50% of the exhaust gas components entering the catalytic converter. Preferably, above the temperature $T_2$, the catalytic converter 30 allows a conversion of 15%, more preferably of 25% and especially preferably of 35% of the exhaust gas components entering the catalytic converter. Therefore, at point in time B, the catalytic converter is not yet fully operationally ready to convert HC, CO and NOx emissions.

During the entire first phase I, the electrically heatable lambda sensor 24 is heated exclusively by means of the electric heating element that is integrated therein. The electrically heatable catalytic converter 30 is heated at least until point in time B by means of the integrated heating element 28, preferably also beyond and/or during the entire period of time I. The energy for electrically heating the lambda sensor 24 and the catalytic converter 30 is preferably provided by the battery system 56, optionally using a voltage converter. Alternatively, the electric preheating takes place during the period of time A to B, during which time the hybrid vehicle is being powered exclusively by the electric drive motor 56 and the internal combustion engine 10 is inactive.

After the operating temperature $T_1$ of the lambda sensor has been reached at point in time B, the internal combustion engine 10 is started and operated in phase II with lambda regulation in a lean operation at a target lambda $\lambda>1$. In this process, an oxygen concentration of the exhaust gas, which is precisely determined by means of the ready-to-use lambda sensor 24, is used to set the air-fuel ratio in the combustion chambers 12 of the internal combustion engine 10 in such a way that the sensor 24 measures the desired target lambda $\lambda>1$. In particular, the internal combustion engine 10 is operated in such a way that the lambda sensor 24 continuously determines a target lambda value of 1.1. This slightly lean operation reduces the HC and CO raw emissions from the combustion exhaust gases. In this manner, a sufficient quality level of the exhaust gas is achieved in spite of the fact that the catalytic converter 30 is not yet fully operational.

During the lean operation in phase II, the temperature of the catalytic converter 30 rises due to a heat transfer from the combustion exhaust gas of the internal combustion engine 10 to the catalytic converter 30 and possibly due to continued electrical heating to a first operating temperature, especially the light-off temperature, of the catalytic converter 30. For the sake of simplicity, the first operating temperature of the catalytic converter 30 is shown in FIG. 3 as being identical to the operating temperature $T_1$ of the lambda sensor. In reality, however, these temperatures may differ from each other.

After the first operating temperature of the catalytic converter 30 has been reached at point in time C, the internal combustion engine 10 is operated stoichiometrically in phase III with lambda regulation. In particular, the internal combustion engine 10 is operated at a continuous target lambda $\lambda=1$. The optimum conversion of the raw exhaust emissions into more harmless compounds takes place in the catalytic converter 30 at this temperature.

In addition, in phase III, the catalytic converter 30 is heated further, among other things, due to the heat transfer from the combustion exhaust gas of the internal combustion engine 10 to the catalytic converter 30. In reality, the temperature increase of the catalytic converter 30 in phase III may be less than the temperature increase of the catalytic converter 30 in phase II or else it can be identical to it. In this case, the period of time C to D (phase III) shown in FIG. 3 is longer than the period of time B to C (phase II). In any case, by the end of phase III, the temperature of the catalytic converter 30 at point in time D rises to a second operating temperature $T_3$. The second operating temperature $T_3$ is an activation temperature of the oxygen storage component 50 that, above this temperature, is able to very efficiently incorporate oxygen into and remove oxygen from its structure. The rate of oxygen uptake and release depends on the oxygen loading of the oxygen storage component 50 as well as on the oxygen partial pressure of the exhaust gas being fed into the catalytic converter 30.

Once the second operating temperature $T_3$ of the catalytic converter 30 has been reached at point in time D, the internal combustion engine 10 is operated stoichiometrically in phase IV with lambda regulation at a fluctuating target lambda value. Thus, the target lambda $\lambda=1$ is not continuously regulated, but rather, is impinged with a forced amplitude of, for example, ±2%. This alternating operation of the internal combustion engine 10 with an alternating slightly rich and slightly lean mixture translates into an optimal utilization of the oxygen storage component 50, which ensures the quality level of the exhaust gas, especially during load changes, and attenuates lambda-regulated stoichiometric operation.

In a preferred embodiment of the method according to the invention for starting the internal combustion engine 10, the internal combustion engine 10 is operated with increased ignition energy, at least during a phase VII, which extends from starting the engine 10 at point in time B until at least the second operating temperature $T_3$ of the catalytic converter 30 has been reached at point in time C (indicated by the broken line in FIG. 3), and alternatively, it also extends to point in time D. Likewise preferably, the operation with increased ignition energy extends into phase IV. However, the ignition energy is set to a normal level at the latest during normal operation of the internal combustion engine 10, which begins during or follows phase IV shown in FIG. 3. In particular, the operation is carried out with increased ignition energy through the use of spark sequence ignitions, at least during phases II, III and at least at times also during phase IV. The increased ignition energy allows smooth and even operation of the internal combustion engine 10 with reduced raw emission fluctuations and thus improved exhaust gas quality.

The combination of the measures shown in FIG. 3 and explained above constitutes a method for starting an internal combustion engine 10 with an optimal raw emission reduction directly after a cold start and with an optimal pollutant conversion during the warm-up phase. This is achieved in that the lambda sensor 24 can already be completely ready to carry out regulations when the engine starts and thus the lambda-regulated operation in phases II, III and IV is carried out with advantageously increased precision. Preferably, the exhaust gas conversion is further improved in that the temperature of the electrically heatable catalytic converter 30 is already above a first threshold temperature $T_2$ when the engine starts at point in time B. Above this temperature, the catalytic converter is able to convert the exhaust gas components entering the catalytic converter, at least to a limited extent.

Figure 4:
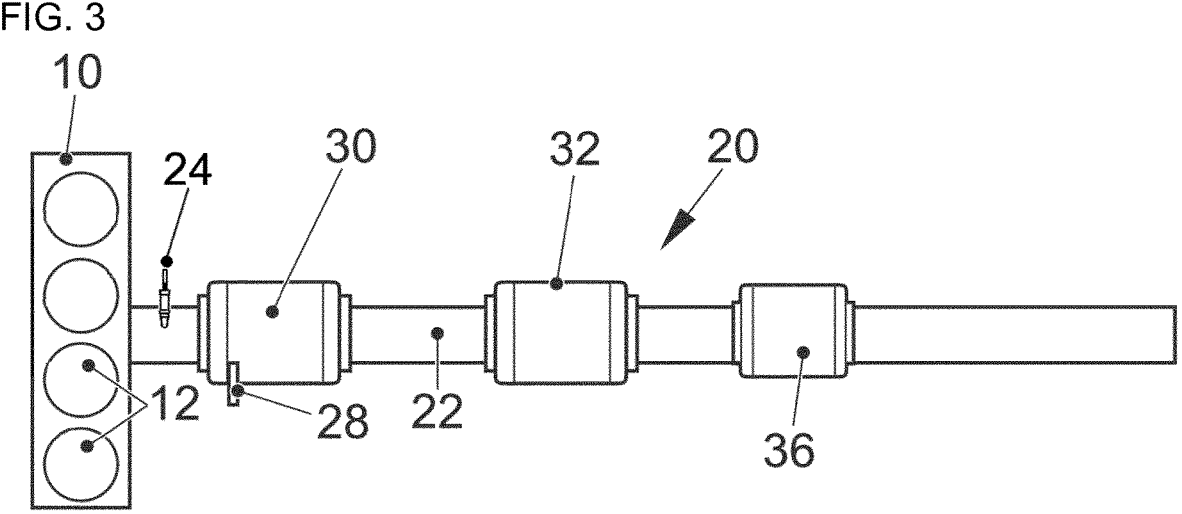

FIG. 4 shows an alternative embodiment of the motor vehicle 1 shown in FIG. 1. Here, with an essentially identical structure, only the internal combustion engine 10 and the exhaust gas system 20 of the internal combustion engine 10 are shown.

In the embodiment shown in FIG. 4, with otherwise the same structure as in FIG. 1, a three-way catalytic converter (TWC) 30 instead of the electrically heated four-way catalytic converter is arranged in the exhaust gas system 20 and, downstream from this TWC 30 and from the second catalytic converter 32, there is additionally a particulate filter 36. Alternatively, an additional particulate filter 36 can also be arranged upstream from the second catalytic converter 32. Alternatively, the functionality of the second three-way catalytic converter 32 and of the particulate filter 36 can be combined in one component, and a four-way catalytic converter 32 can be arranged in the exhaust gas channel 22 downstream from an electrically heatable three-way catalytic converter 30.

In a likewise preferred embodiment of the exhaust gas system 20, the heatable lambda sensor 24 is arranged upstream from a preferably heatable three-way catalytic converter 32 and from a particulate filter 36, whereby a four-way catalytic converter 30 is likewise dispensed with. Alternatively, the heatable lambda sensor 24 can also be arranged in an exhaust gas system 20 in combination with only a single heatable or non-heatable three-way catalytic converter or a single heatable or non-heatable four-way catalytic converter. Preference is also given to two heatable or non-heatable three-way catalytic converters that are arranged downstream from the heatable lambda sensor 24. A likewise preferred embodiment of the exhaust gas system 20 corresponds to the embodiment shown in FIG. 1, whereby the sequence of the arrangement of the three-way catalytic converter 32 and of the four-way catalytic converter 30 in the exhaust gas system 22 is switched with each other.

LIST OF REFERENCE NUMERALS

1 motor vehicle
10 internal combustion engine
12 combustion chamber
14 spark plug
20 exhaust gas system
22 exhaust gas channel
24 electrically heatable lambda sensor
26 temperature sensor
28 electric heating element
30 electrically heatable catalytic converter
32 second catalytic converter
36 particulate filter
42 control unit
44 door contact switch
46 receiver
48 belt lock sensor
50 oxygen storage component (OSC)
52 outlet
54 battery
56 electric drive motor
58 sensor for detecting whether the seat is occupied
λ target lambda
Tλ temperature of the lambda sensor
TK temperature of the catalytic converter
$T_1$ operating temperature of the lambda sensor/first operating temperature of the catalytic converter
$T_2$ threshold temperature of the catalytic converter
$T_3$ second operating temperature of the catalytic converter

The invention claimed is:

1. A method for starting an internal combustion engine comprising an attached exhaust gas system having an electrically heatable lambda sensor and a catalytic converter with an oxygen storage component, and comprising a control unit, said method encompassing the following steps:
   in response to the control unit having received a first control signal, electrically heating the lambda sensor while the internal combustion engine is still switched off,
   once an operating temperature of the lambda sensor has been reached, starting the internal combustion engine, and initiating a lambda-regulated lean operation of the internal combustion engine,
   initiating a lambda-regulated stoichiometric operation of the internal combustion engine once a first operating temperature of the catalytic converter has been reached, and
   initiating a lambda-regulated stoichiometric operation of the internal combustion engine with a varying target lambda value once a second operating temperature of the catalytic converter has been reached.

2. The method according to claim 1, whereby the first operating temperature of the catalytic converter is the light-off temperature of the catalytic converter, and the second operating temperature of the catalytic converter is an activation temperature of the oxygen storage component.

3. The method according to claim 1, whereby, in the lambda-regulated lean operation of the internal combustion engine, the target lambda value is between 1.05 and 1.15.

4. The method according to claim 1, whereby the target lambda value fluctuates between 0.98 and 1.02 once the second operating temperature has been reached.

5. The method according to claim 1, whereby the internal combustion engine is operated with increased ignition energy in a lean operation until the first operating temperature of the catalytic converter is reached.

6. The method according to claim 1, whereby the catalytic converter has an electric heating element and the catalytic converter is electrically heated up after the control unit has received the first control signal.

7. The method according to claim 1, whereby the reaching of the first operating temperature of the catalytic converter and/or of the second operating temperature of the catalytic converter is determined by means of a temperature sensor arranged on or in the catalytic converter or else by using an exhaust gas temperature model.

8. The method according to claim 1, whereby the first control signal is generated by a door contact switch, by a receiver of a signal from a keyless locking system or from a central lock, by a belt lock contact, or by a load-state sensor of a battery system.

9. A motor vehicle with an internal combustion engine comprising:
- an attached exhaust gas system having an electrically heatable lambda sensor and a catalytic converter with an oxygen storage component, and
- a control unit,
- whereby the control unit is configured to carry out a method according to claim 1.

10. The motor vehicle according to claim 9, also having an electric drive motor powered by a battery system, whereby the battery system has a charging-state sensor configured to output the first control signal.

* * * * *